United States Patent
Ogino et al.

(10) Patent No.: US 7,657,975 B2
(45) Date of Patent: Feb. 9, 2010

(54) ENDLESS BOOT FIXING BAND AND MANUFACTURING METHOD THEREOF

(75) Inventors: Takashi Ogino, Yokohama (JP); Yoshihiro Hemmi, Ina (JP); Hiroshi Ikeda, Ina (JP)

(73) Assignee: NHK Spring Co., Ltd., Yokohama-Shi, Kanagawa (JP)

( * ) Notice: Subject to any disclaimer, the term of this patent is extended or adjusted under 35 U.S.C. 154(b) by 379 days.

(21) Appl. No.: 11/576,454

(22) PCT Filed: Sep. 28, 2005

(86) PCT No.: PCT/JP2005/017878

§ 371 (c)(1),
(2), (4) Date: Mar. 30, 2007

(87) PCT Pub. No.: WO2006/035832

PCT Pub. Date: Apr. 6, 2006

(65) Prior Publication Data

US 2008/0250610 A1    Oct. 16, 2008

(30) Foreign Application Priority Data

Sep. 30, 2004    (JP) .............................. 2004-289043

(51) Int. Cl.
*F16L 33/20*    (2006.01)
(52) U.S. Cl. ................. 24/20 R; 24/20 CW; 24/20 EE; 24/17 A; 24/17 B
(58) Field of Classification Search ........................ None
See application file for complete search history.

(56) References Cited

U.S. PATENT DOCUMENTS 1,173,998 A * 2/1916 Depew .................. 217/93
4,305,608 A   12/1981 Stuemky et al.

FOREIGN PATENT DOCUMENTS

| DE | 19756074 | 9/1999 |
|---|---|---|
| EP | 62278256 | 12/1987 |
| EP | 0 809 034 | 11/2000 |
| FR | 2855584 | 12/2004 |
| JP | S49-34112 | 9/1974 |
| JP | S49-34112 A | 9/1974 |
| JP | S61-184209 A | 8/1986 |
| JP | S62-278256 A | 12/1987 |
| JP | 3253610 | 11/2001 |
| JP | 200270813 | 11/2002 |

OTHER PUBLICATIONS

European Search Report from corresponding application No. 05787924.9.

* cited by examiner

*Primary Examiner*—Jack W. Lavinder
(74) *Attorney, Agent, or Firm*—Lowe Hauptman Ham & Berner, LLP

(57) ABSTRACT

The rotation of the band in relation to a boot to be fastened is prevented, so that reduction of the boot-fastening force is prevented, thereby preventing leakage of grease from a boot to be fastened, and so that boot-bands can be manufactured simply. An endless boot-fixing band 1 is formed as an endless ring, and is reduced in diameter by plastic deformation so as to fasten a boot by applying pressure onto said boot's outer surface. The boot band is formed entirely of an Al—Mg—Si alloy, and a surface-pressure-altering part 3, which changes the surface pressure for fastening the boot, is formed on the inner surface of the band.

5 Claims, 4 Drawing Sheets (a)

⇩

(b)

(a)

(b)

ENDLESS BOOT FIXING BAND AND MANUFACTURING METHOD THEREOF

FIELD OF THE INVENTION

The present invention relates to an endless boot-fixing band that is used for fastening and fixing a boot made of rubber or resin to a constant-velocity joint of an automobile, and to a method of manufacturing said boot-fixing band.

DESCRIPTION OF THE RELATED ART

In a constant-velocity joint of an automobile, tubular members opposed to each other are covered by/with a boot made of rubber or resin, so that the tubular members are connected together. The constant-velocity joint is supplied with grease so as to keep the joint lubricious at the time of rotation or steering. A boot-band for fastening the boot to the tubular member is used to prevent the grease from leaking from the boot and to prevent dust and water from entering the boot. The boot-band described in Patent Document 1 is such a boot-band.

The boot-band described in Patent Document 1 has a structure such that a projection is provided at one end of a metallic, band-like member, and an indentation to be coupled with that projection is provided at the other end. The projection is fitted with the indentation, so that this boot-band assumes a ring-like shape having an inside diameter that is slightly larger than the outside diameter of the boot to be fastened. The diameter of the band is reduced by plastic deformation using an appropriate special clamping machine, so as to fasten the boot.

In such a boot-band, when the diameter of the band is reduced, there result a tensile force in the width direction of the band and a compression force in the thickness direction of the band. If those two forces, while acting on the coupling portion, where the aforementioned projection and indentation are fitted together, become too large, sufficient fastening force cannot be secured at the coupling portion, resulting in problems such as leakage of grease and breakage of the coupling portion. To prevent these problems, it is necessary to increase the thickness and/or the width of the band, so as to enlarge the cross-sectional area of the coupling portion. However, if the thickness is increased the boot-band becomes bulky and needs more space in its height direction, and if the width is increased the boot-band needs more space in its width direction. This creates such a problem that a constant-velocity joint or the like cannot be used in a small space.

For the above-mentioned reasons, a boot-band, which is prearranged to have an endless-ring shape, has been used. That is, a ring-like boot-band whose inside diameter is slightly larger than the outside diameter of a boot is used; when the boot is inserted in the boot-band, the boot-band's inside diameter is reduced by a clamping machine so as to clamp and secure the boot. For example, a boot-band having a structure as described in Patent Document 2 is such an endless, ring-like boot-band.

[Patent Document 1] Japanese Patent No. 3253610
[Patent Document 2] Japanese Published Unexamined Patent Application No. 2002-70813

DISCLOSURE OF THE INVENTION

Problems to be Solved by the Invention

The above-mentioned endless, ring-like boot-band has a uniform cross-sectional shape throughout its circumferential direction, and therefore the surface pressure generated on the boot by the inner surface of the boot-band at the time of fastening is constant throughout the circumference of the boot. However, if the surface pressure is constant in this way, the boot and the boot-band easily move relative to each other in a dynamic environment wherein vibrations, inertia moments, shocks, and the like are experienced, and as a result the boot and the boot-band rotate relative to each other. Such rotation causes friction between the boot and the boot-band, and this friction causes abrasion of the boot, which is weaker in strength than the boot-band. Abrasion of the boot causes the boot to become smaller, resulting in reduction of the boot-band's fastening force, and therefore the boot-band cannot sufficiently fasten the boot. Such reduction of the fastening force causes a problem of grease leaking out from the boot.

To manufacture an endless ring-like boot-band, billets are molded into a long pipe by extrusion molding, and this pipe is cut into pieces in such a way that all of them have the same predetermined width. If an antirust treatment, such as plating, has already been applied to the pipe, then when the pipe is cut into said pieces having the same predetermined width the cut surface of each piece of the pipe becomes exposed to the air. For this reason, after the boot-band is manufactured, an antirust treatment is again necessary. Therefore, an increased number of processing steps are necessary, which is troublesome.

In view of the above-mentioned problems, the objectives of the present invention are to provide (1) an endless boot-fixing band that, even in an endless ring-shape, is prevented from rotating relative to the boot, so as to avoid reduction of the boot-fastening force and thereby to prevent grease from leaking out of the boot, and (2) a simple method of manufacturing said boot-fixing band.

Means of Solving the Problems

The endless boot-fixing band described in claim 1 is a band that
- is formed into an endless-ring-like shape,
- when plastically deformed so as to reduce its own diameter, fastens a boot from the outside of the boot,
- is formed in its entirety of an Al—Mg—Si alloy, and
- has on its inner surface a surface-pressure-altering part for changing the pressure that the band applies onto the boot to be fastened.

With the boot-fixing band described in Claim 1, the surface-pressure-altering part that is provided on the inner surface of the band changes the boot-fastening surface pressure. For this reason, the surface pressure does not remain uniform across the entirety of the inner surface of the band, and therefore the boot is prevented from rotating relative to the band as described above. As a result, abrasion of the boot due to such rotation does not occur, and therefore the outer diameter of the boot does not get any smaller, which in turn results in the band being able to fasten the boot without needing to increase its fastening force over time. This prevents grease from leaking out of the boot over time.

The entire band is formed of an Al—Mg—Si alloy, so that the band will be durable and will have sufficient strength to withstand a boot-fastening load. In addition, the Al—Mg—Si alloy is corrosion resistant and therefore it does not need an antirust treatment, such as plating. Accordingly, even when this alloy is cut into pieces, the surfaces of the cut pieces do not need an antirust treatment. Therefore, the band can be manufactured by a simple process.

The invention described in Claim 2 is the endless boot-fixing band described in Claim 1, and wherein the surface-pressure-altering part is formed so as to extend in a direction approximately parallel to the width direction of the band.

With the boot-fixing band described in Claim 2, the surface-pressure-altering part extends in a direction approximately parallel to the width direction of the band, so that the surface-pressure-altering part acts—in the direction that crosses the direction of the band's rotation relative to the boot—so as to change the surface pressure. Therefore, rotation of the band and boot in relation to each other can surely be avoided.

The invention described in Claim 3 is the endless boot-fixing band described in Claim 1, and wherein the surface-pressure-altering part is a combined projection-indentation part that extends in a direction approximately parallel to the width direction of the band and that is formed on the entire inner surface of the band.

With the boot-fixing band described in Claim 3, the surface-pressure-altering part extends in a direction approximately parallel to the width direction of the band, and therefore the rotation of the band in relation to the boot can be avoided, as with the boot-fixing band described in Claim 2. In addition, the surface-pressure-altering part comprises an indentation and projection part that is formed on the entire inner surface of the band, and this indentation and projection part on the entire inner surface of the band prevents the band from rotating in relation to the boot. Therefore rotation of the band and boot in relation to each other can be prevented even more surely.

The invention described in Claim 4 is a method for manufacturing an endless boot-fixing band, with said method comprising a step for extrusion-molding a billet—that is made of an Al—Mg—Si alloy—into an endless ring-like pipe, as well as simultaneously forming on the inner surface of the pipe a surface-pressure-altering part that extends in a direction approximately parallel to the pipe's lengthwise direction, a step—after cooling the pipe—for cutting the pipe into multiple shorter pipe pieces of a predetermined length, a step for age-hardening the pipe pieces so as to harden the alloy, and a step for cutting the age-hardened pipe pieces into rings of a predetermined width.

In the method described in Claim 4, when the billet is extrusion-molded to become a pipe, a surface-pressure-altering part is simultaneously formed on the inner surface of the pipe. After this, the pipe is cut into pipe pieces. The pipe pieces are age-hardened, and then cut into rings of a predetermined width. For this reason, it is not necessary to subsequently form surface-pressure-altering parts on the respective rings, and therefore the processing is easy. Also, because the pipe is made of an Al—Mg—Si alloy, the rings into which the pipe is cut do not need an antirust treatment such as plating. Thus, endless boot-fixing bands of the present invention can be mass-produced easily.

Effects of the Invention

With the endless boot-fixing band of the present invention, the surface-pressure-altering part is provided on the inner surface of the band so as to prevent the rotation of the band in relation to the boot, and therefore abrasion of the boot does not occur. Therefore, the initial force for fastening the boot can be maintained, and grease can be prevented from leaking out of the boot. Also, the entire band is formed of an Al—Mg—Si alloy and has excellent corrosion resistance.

Therefore, even if the pipe is cut into pieces, there is no need to apply an antirust treatment on the surfaces of the pieces, and therefore the band can be manufactured simply.

In the method for manufacturing the endless boot-fixing band of the present invention, when a pipe is extrusion-molded, a surface-pressure-altering part is simultaneously formed on the inner face of the pipe. Therefore there is no need to subsequently form surface-pressure-altering parts on the rings into which the pipe is cut. Also, because an Al—Mg—Si alloy, which is corrosion resistant, is used as the material for the band, there is no need for an antirust treatment, so that the boot-fixing band can be manufactured simply.

BRIEF DESCRIPTIONS OF THE DRAWINGS

Figure 8:
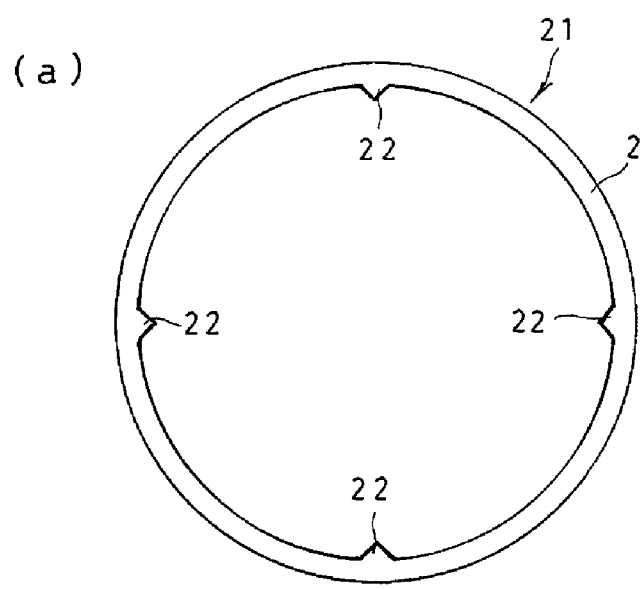
Figure 8:
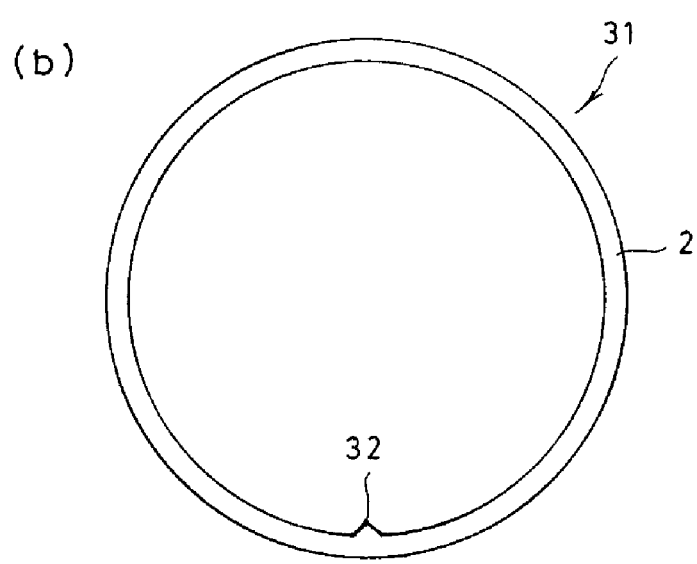

FIG. 8 consists of two front views showing a boot-fixing band in another embodiment of the present invention.

EXPLANATIONS OF THE REFERENCE NUMERALS 1, 21, 31 boot-fixing bands
2 band body
2a inner face of the band body
3 combined projection and indentation (surface-pressure-altering part)
4 projection
5 indentation

BEST MODE FOR CARRYING OUT THE INVENTION

Figure 1:
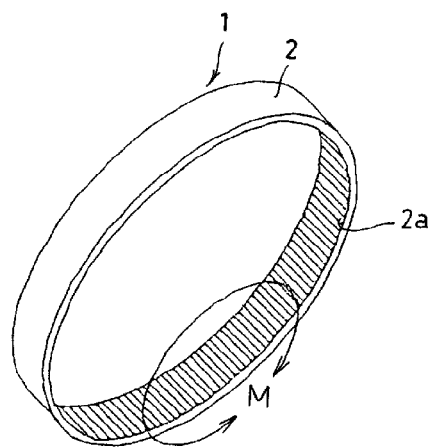
FIG. 1 is a perspective view of a boot-fixing band in one embodiment of the present invention.
Figure 2:
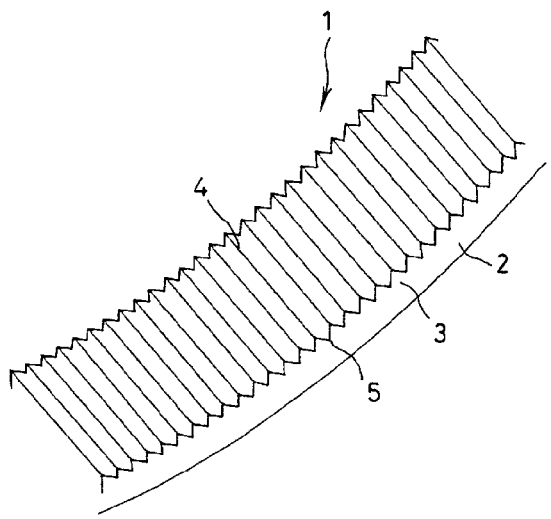
FIG. 2 is an enlarged perspective view of the portion M in FIG. 1.

FIG. 1 is a perspective view of an endless boot-fixing band 1 in one embodiment of the present invention, and FIG. 2 is an enlarged perspective view of the portion M of FIG. 1.

The endless boot-fixing band (hereinafter referred to as "boot-fixing band") 1 comprises a band body 2, and combined projections and indentations 3 that are formed as a surface-pressure-altering part on the inner face of the band body 2. The boot-fixing band 1 is used for fastening a boot (not shown), which is made of rubber or resin and that is used for a constant-velocity joint (not shown) of an automobile, onto a tubular member of the constant-velocity joint.

The band body 2 is formed into an endless ring (annular shape) whose inside diameter is slightly larger than the outside diameter of the boot to be fastened. To fasten the boot, the boot is inserted inside the band body 2, and under this condition the band body 2 is plastically deformed by a special clamping machine so as to reduce the diameter of the band body 2. The band body 2 is formed as an endless ring, so that there is no need to use a belt-like band. Therefore, unlike the case with a belt-like band, there is no need for coupling portions at the two ends of the band so as to form the band body into a ring shape, and thus there is no need to worry about weakening of the fastening force at the coupling portions, which would lead to leakage of grease or breakage of the coupling portions. Accordingly, there is no need to increase the thickness or width of the band body, and therefore the boot-fixing band can be applied well in a small space.

The combined projections and indentations 3 are formed on the entire inner face 2a of the band body 2. In this embodiment, the cross-sections of the combined projections and indentations 3 are triangular and continuous across the entire inner face 2a of the band body 2. Incidentally, the cross-sections of the indentations and projections 3 can also be rectangular, trapezoidal, or arc-like.

The combined projections and indentations 3 are formed so as to extend in a direction approximately parallel to the width direction of the band body 2 so as to cross the inner face 2a of the band body 2 in the width direction. By forming the projections and indentations 3 on the entire inner face 2a of the band body 2, particular portions where the surface pressure is increased can be formed at the peaks of the projections. Therefore, the surface pressure applied to the boot by the boot-fixing band 1 is not uniform across the outer surface of the boot, and therefore the boot-fixing band 1 and the boot do not rotate relative to each other, even in a dynamic environment where vibrations, inertia moments, and shocks are experienced. Accordingly, the boot does not experience the abrasions that would result if such rotation of the band and boot in relation to each other were to occur, and therefore the boot-fixing band 1 can over time maintain its initial force for fastening the boot, which surely prevents grease from leaking from the boot.

Figure 3:
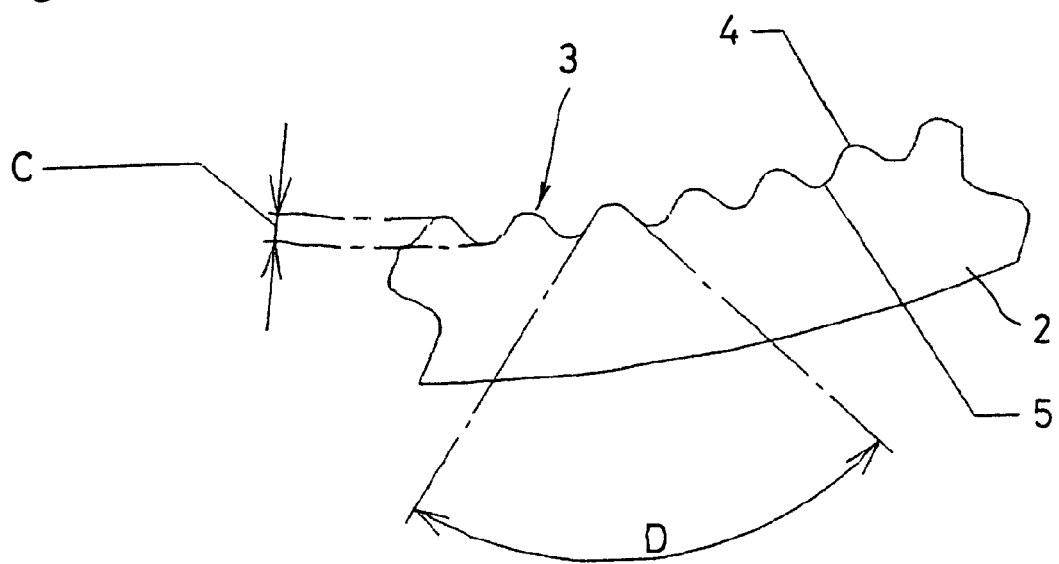
FIG. 3 is a front view showing the dimensions of a combined in one embodiment of the present invention.
Figure 4:
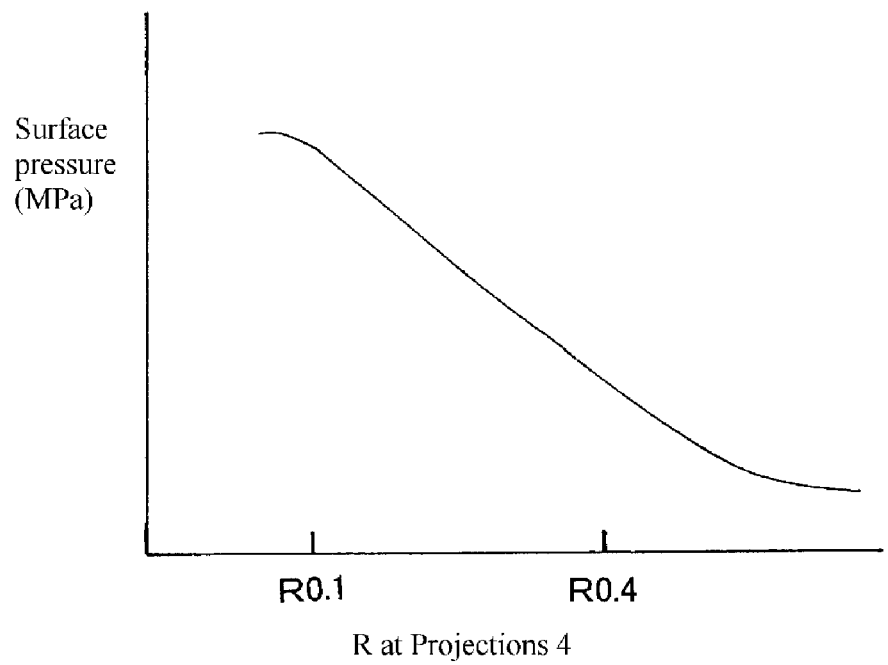
FIG. 4 is a chart that shows the relation between the projections and the surface pressure at the projections and indentations.
Figure 5:
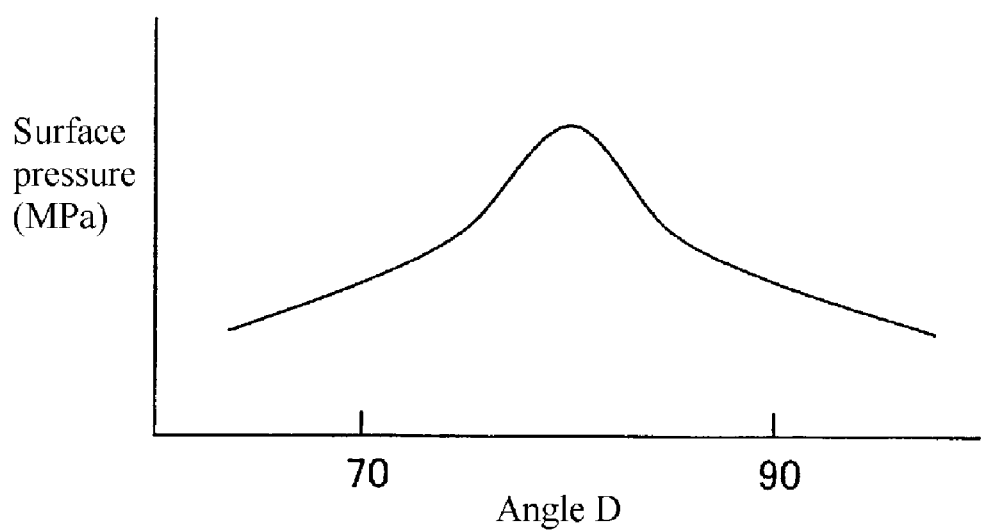
FIG. 5 is a chart that shows the relation between the angle of the projections and the surface pressure at the projections and indentations.

FIG. 3 shows the dimensions of a combined projection and indentation 3 in this embodiment, and FIGS. 4 and 5 are charts that show the relation between those dimensions and the surface pressure.

In FIG. 3, number 4 designates a projection per se of the combined projections and indentations 3, and number 5 designates an indentation per se of the combined projections and indentations 3. As shown in FIG. 4, the triangular cross-sections are smoothly connected with each other by a curvature. The dimension C is the distance (amplitude) between a projection 4 and an indentation 5, and the angle D is the spread angle of a projection 4. If the thickness of the band body 2 is 1.7 mm and the band body 2 is made of an Al—Mg—Si alloy as described below, it is preferable that the curvature R of the projection 4 be within the range of 0.1 mm-0.4 mm, that the curvature R of the indentation 5 be within the range of 0.1 mm-0.4 mm, that the amplitude C be within the range of 0.2 mm-0.5 mm, and that the angle D be within the range of 70 degrees-90 degrees.

In this embodiment, if the curvature R of the projections 4 exceeds 0.4 mm, the surface-pressure-increasing effect at that location becomes small, as shown in FIG. 4, and therefore the effect for preventing relative displacement against the boot becomes small. Therefore, the boot becomes able to rotate relative to the boot band 2, which is not desirable. If the curvature R of the projections 4 is less than 0.1 mm, the local surface-pressure-increasing effect at that location is large, but the damage caused to the boot also increases, and the boot is easily broken, which also is not desirable.

When a load is applied to the indentations 5 at the time of fastening the boot, the stress is concentrated on the indentations 5. If the curvature R of the indentations 5 is less than 0.1 mm, the anti-breakage strength of the boot band 2 deteriorates, and therefore it is preferable that the curvature R of the indentations 5 be within the above-specified range.

If the amplitude C is less than 0.2 mm, the extent of the protrusion of the projections 4 of the combined projections and indentations 3 becomes small, and therefore the desired surface-pressure-increasing effect cannot be obtained, and the boot becomes able to rotate relative to the boot band 2, which is not desirable. If the amplitude C exceeds 0.5 mm, the thickness of the band body 2 is correspondingly reduced, and the anti-breakage strength of the band body 2 deteriorates, which is not desirable. In addition, if the amplitude C exceeds 0.5 mm, clearance is generated due to the relief that is created when the boot goes into the indentations 5 at the time of fastening the boot. Therefore, the surface pressure generated at the indentations 5 becomes small, and therefore grease leaks out from the boot, which also is not desirable.

As shown in FIG. 5, the angle D ranges within 70 degrees to 90 degrees, where the surface pressure becomes maximum. If the angle D is less than 70 degrees, the angle of the projections 4 becomes acute, and therefore stress concentrates on the indentations 5, which is not desirable. If the angle D exceeds 90 degrees, the pitch between the projections 4 and the indentations 5 becomes large and wide. Therefore, the surface-pressure-increasing effect becomes small, and the boot rotates relative to the boot band 2, which is not desirable.

The above-mentioned dimensions of the projections 4, the indentations 5, the amplitude C, and the angle D apply only when the band body 2 has a thickness of 1.7 mm, is made of an Al—Mg—Si alloy, and has a triangular cross-section, in which the combined projections and indentations 3 smoothly continue with the curvature R, as described above. If any one of these conditions differs, the optimum dimensions change accordingly.

Figure 6:
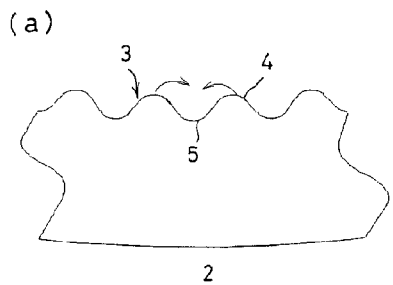
FIG. 6 is a front view that shows the diameter of the boot-fixing band being reduced due to plastic deformation.
Figure 6:
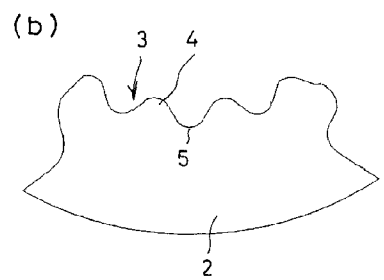

FIG. 6 shows another effect of this embodiment. In this embodiment, the triangular cross-sections are continuously arranged at an equal pitch, so that the combined projections and indentations 3 are formed. Therefore, as shown in FIG. 6(a), when the diameter of the band body 2 is reduced by plastic deformation, the projections 4 on both sides of the indentations 5 are folded from the indentations 5 as a starting point, as shown by the arrow. Thus, as shown in FIG. 6(b), the projections 4 are uniformly displaced according to the plastic deformation at the time that the diameter of the band body 2 is reduced, so that the entire boot can be fastened surely.

Figure 7:
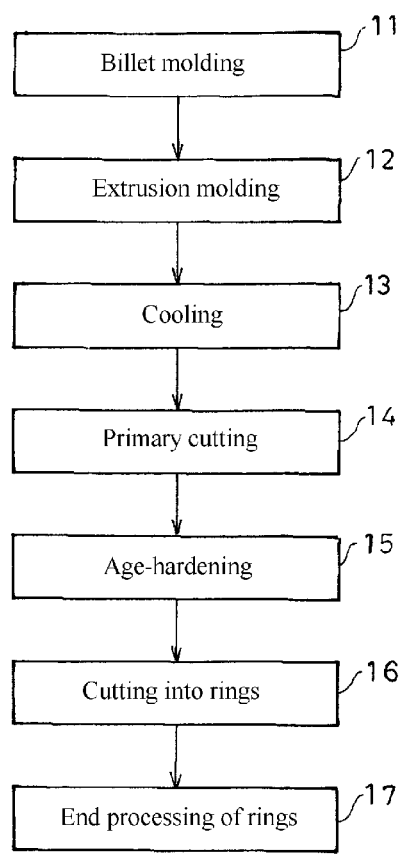
FIG. 7 is a flow chart showing the steps involved in manufacturing a boot-fixing band.

FIG. 7 consists of a flow chart that shows the steps in manufacturing the boot-fixing band 1. The band body 2, and particularly the boot-fixing band 1, is formed entirely of an Al—Mg—Si alloy. As an Al—Mg—Si alloy, A6063 and the like (which are alloys described in JISH4100) can be used, for example. This Al—Mg—Si alloy is strong and has an anti-rust property and thus is corrosion resistant.

In Step 11, a billet 2 is molded from the Al—Mg—Si alloy. As the billet 2, a block with a columnar shape or the like is preferable.

In Step 12, extrusion molding is done using a billet 2. At the time of extrusion molding, the billet 2 is heated so that the billet 2 can be processed. Under this heated condition, the billet 2 is extruded along a columnar die, so that hot extrusion is done so as to mold the pipe. At that time, the outer surface of the die has indentations and projections, which are reversed forms of the combined indentations and projections 3 shown in FIG. 2. As a result, when the billet 2 is extruded along the die, the combined indentations and projections 3 are simultaneously formed on the inner surface of the pipe.

In Step 13, the extrusion-molded pipe is cooled with water or air so as to be hardened. In Step 14, the extrusion-molded pipe is first cut. By this primary cutting, the pipe is formed into a pipe material of a predetermined length, so that the handling of the pipe during delivery and its workability in the next step are improved.

In Step 15, the cut pipe material is age-hardened. As the temperature increases during heat processing in the age-hardening step, the solubility of the solid-metal molecules is increased, and Mg2Si as an intermetallic compound is separated out from a supersaturated solid solution. In that way the alloy is hardened. By this hardening of the alloy, strength is given to the boot-fixing band 1.

In Step 16, the age-hardened pipe material is cut into pieces having a predetermined width, so that rings are formed. The rings are an original form of a boot-fixing band 1. As shown in Step 17, edge-processing is applied to the rings. The edge-processing consists of deburring and removal of acute angles on the cut surface of the rings, and that processing is done by barrel-polishing and the like. Such edge-processing is done in case the cut surface of the rings is not smooth. If the cut surface of the rings is smooth enough, edge-processing is not required.

In the above-described manufacturing method, when the pipe is molded by extrusion-molding of the billet, the combined indentations and projections 3 (which serve as the surface-pressure-altering parts) are simultaneously formed on the inner surface of the pipe. Thereafter, the pipe is cut into rings, so that subsequent creation of combined indentations and projections 3 on the respective rings, i.e., the boot-fixing bands 1, is not required. Accordingly, the boot-fixing bands 1 that have the combined indentations and projections 3 can be easily processed.

Also, the pipe is entirely formed of the Al—Mg—Si alloy, so that anti-rust processing such as plating is not required on the boot-fixing bands 1 that are obtained by cutting the pipe. Therefore, the boot-fixing bands 1 can be easily mass-produced via a simple process.

FIG. 8 shows boot-fixing bands 21 and 31 in another embodiment of the present invention. In the boot-fixing band 21 shown in FIG. 8(a), protrusions 22 are formed at four equally separate positions on the inner surface of the endless ring-like band body 2. In the boot-fixing band 31 shown in FIG. 8(b), a protrusion 32 is formed at one portion on the inner surface of the endless ring-like band body 2. The protrusions 22 and 32 can be triangular, arc-shaped, cross-sectionally rectangular in shape, trapezoidal, or of another shape.

The respective protrusions 22 and 32 are formed almost in parallel to the width direction (the penetrating direction in the drawing, i.e., the direction perpendicular to the surface of the paper of the drawing) of the band body 2, and across the inner surface of the band body 2 in the width direction, so that the protrusions 22 and 32 change the boot-fastening surface pressure. Accordingly, the protrusions 22 and 32 serve as surface-pressure-altering parts similar to the above-mentioned combined indentations and projections 3, so that rotation of the boot in relation to the band body 2 can be prevented, which in turn prevents grease from leaking from the boot.

In addition, in the embodiment shown in FIG. 8, the band body 2 is entirely formed of an Al—Mg—Si alloy. Therefore, anti-rust processing such as plating is not required, so that manufacturing of boot-bands is simple.

The present invention is not limited to the above-mentioned embodiments, and various variations can be made to the invention. For example, the combined indentations and projections 3 shown in FIGS. 1 and 2, and the protrusions 22 and 32 shown in FIG. 8 do not have to be formed across the entire width of the band, but can be formed at one location in the width direction of the band. In such a case, the indentations and projections, and the protrusions can also function as the surface-pressure-altering parts for preventing the rotation of the band body 2 and the in relation to each other. The number of protrusions 22 and 32 is not limited to the number shown in FIG. 8; even just one protrusion will be sufficient. Further, the indentations and projections 3, and the protrusions 22 and 32 formed on the inner surface of the band body 2 do not have to be formed at the same time as extrusion-molding of the pipe; they can be formed by post-processing.

INDUSTRIAL APPLICABILITY

The endless boot-fixing band of the present invention can prevent rotation of the boot in relation to the boot band, so that abrasion of the boot does not occur. Therefore, the initial fastening force on the boot can be maintained over time, and leakage of grease from the boot can be prevented.

What is claimed is:

1. An endless boot-fixing band to be fixed onto a boot, said band comprising:
   a band formed in an endless-ring share having an inner surface; and
   a surface-pressure-altering part extending in a width direction of the band on the inner surface for changing pressure that the band applies onto the boot,
   wherein
   said band is plastically deformable so as to reduce its own diameter and fastens the boot from outside of the boot,
   said band is formed of an Al—Mg—Si alloy,
   said surface-pressure-altering part extends in a peripheral direction of the band, and a cross-section of said surface-pressure-altering part is triangular.

2. The endless boot-fixing band described in claim 1, wherein the surface-pressure-altering part is formed to extend in the peripheral direction approximately parallel to the width direction of the band.

3. The endless boot-fixing band described in claim 1, wherein the surface-pressure-altering part is a combined projection-indentation part that extends in the peripheral direction approximately parallel to the width direction of the band and that is formed on the entire inner surface of the band.

4. The endless boot-fixing band described in claim 3, wherein said band further comprises an outer surface opposite to the inner surface, and said combined projection-indentation part is not formed on the outer surface of the band.

5. A method for manufacturing an endless boot-fixing band, with said method comprising
   (a) a step for extrusion-molding a billet—that is made of an Al—Mg—Si alloy—into an endless ring-like pipe, as well as simultaneously forming on the inner surface of the pipe a surface-pressure-altering part that extends in a direction approximately parallel to the pipe's lengthwise direction,
   (b) a step—after cooling the pipe—for cutting the pipe into multiple shorter pipe pieces of a predetermined length,
   (c) a step for age-hardening the pipe pieces so as to harden the alloy, and
   (d) a step for cutting the age-hardened pipe pieces into rings of a predetermined width.

* * * * *